United States Patent
Lingnau et al.

(10) Patent No.: US 7,931,184 B2
(45) Date of Patent: Apr. 26, 2011

(54) APPARATUS FOR INDUCTION FRICTION SOLID STATE WELDING

(75) Inventors: David Lingnau, Calgary, CA (US); Colin McDonald, Calgary, CA (US)

(73) Assignee: Spinduction Weld, Inc., Alberta (CA)

( * ) Notice: Subject to any disclaimer, the term of this patent is extended or adjusted under 35 U.S.C. 154(b) by 78 days.

(21) Appl. No.: 12/311,078

(22) PCT Filed: Sep. 18, 2007

(86) PCT No.: PCT/CA2007/001667
§ 371 (c)(1),
(2), (4) Date: Mar. 18, 2009

(87) PCT Pub. No.: WO2008/046184
PCT Pub. Date: Apr. 24, 2008

(65) Prior Publication Data
US 2010/0038404 A1 Feb. 18, 2010

Related U.S. Application Data

(60) Provisional application No. 60/845,417, filed on Sep. 18, 2006.

(51) Int. Cl.
*B23K 20/12* (2006.01)
*B23K 37/00* (2006.01)
(52) U.S. Cl. .................................... 228/2.1; 228/112.1
(58) Field of Classification Search .............. 228/212, 228/213, 44.3, 44.5, 112.1–114.5, 2.1–2.3; 219/603, 607, 610, 611, 617
See application file for complete search history.

(56) References Cited

U.S. PATENT DOCUMENTS

| | | | |
|---|---|---|---|
| 3,007,022 A | 10/1961 | Jackson et al. | |
| 3,229,941 A * | 1/1966 | Suliteanu et al. | 248/163.1 |
| 3,967,387 A * | 7/1976 | Marchegiani | 434/58 |
| 4,343,610 A * | 8/1982 | Chou | 434/58 |
| 5,021,982 A * | 6/1991 | Crosbie et al. | 703/8 |
| 5,179,525 A * | 1/1993 | Griffis et al. | 703/1 |
| 6,022,005 A * | 2/2000 | Gran et al. | 267/136 |
| 6,196,081 B1 | 3/2001 | Yau | |
| 6,637,642 B1 | 10/2003 | Lingnau | |

FOREIGN PATENT DOCUMENTS

| | | |
|---|---|---|
| CA | 2349339 | 5/2000 |
| CN | 1546270 | 11/2004 |
| JP | 55-075890 | 6/1980 |
| JP | 5131280 | 5/1993 |
| JP | 10202373 | 8/1998 |
| WO | 9200840 | 1/1992 |

\* cited by examiner

*Primary Examiner* — Emily M Le
*Assistant Examiner* — Megha Mehta
(74) *Attorney, Agent, or Firm* — Davis & Bujold, P.L.L.C.

(57) ABSTRACT

An apparatus for induction friction solid state welding a body having a work piece receiving bore. A stationary chuck is provided for securing a first tubular workpiece in the bore. A moving chuck is provided for securing a second tubular workpiece in bore. An induction heating coil is movable between an operative position and a stored position. An expandable cylinder moves the moving chuck toward and away from the stationary chuck. A torque transmission collar is used to rotate the moving chuck.

10 Claims, 15 Drawing Sheets

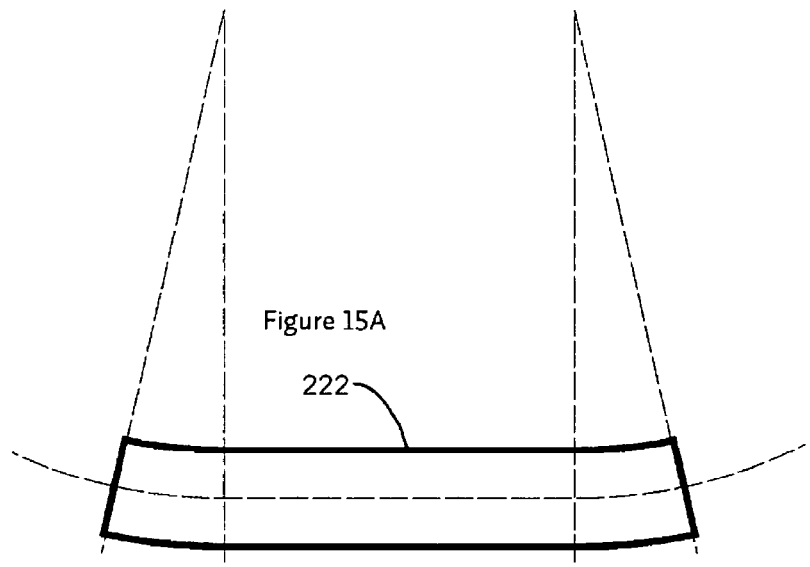
Figure 15A
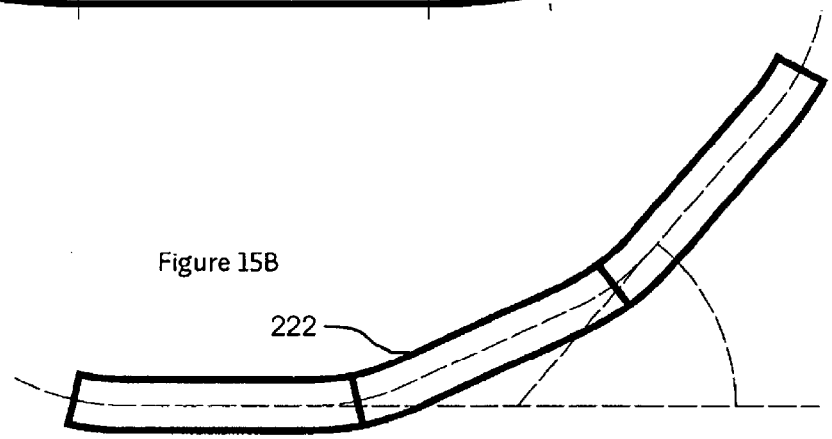
Figure 15B
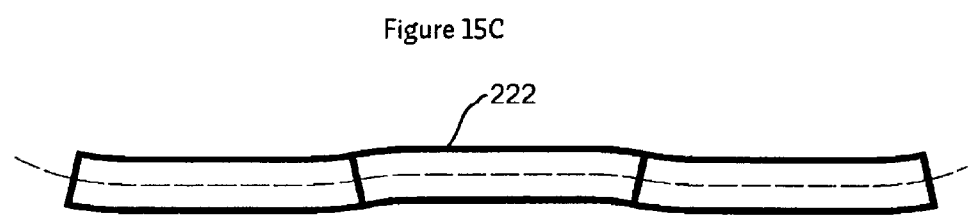
Figure 15C
Figure 15

APPARATUS FOR INDUCTION FRICTION SOLID STATE WELDING

FIELD

The present invention relates to an apparatus which has been developed for use in induction friction solid state welding processes.

BACKGROUND

U.S. Pat. No. 6,637,642 (Lingnau) entitled "Method of solid state welding and welded parts" describes an induction friction solid state welding process.

SUMMARY

There is provided an apparatus for induction friction solid state welding which includes a body having a first end, a second end and a work piece receiving bore that extends between the first end and the second end. First securing means are provided for temporarily securing a first tubular workpiece in the work piece receiving bore. Second securing means are provided for temporarily securing a second tubular workpiece in the work piece receiving bore. Induction heating means are movable between an operative position within the work piece receiving bore and a stored position withdrawn from the work piece receiving bore. Means are provided for effecting relative movement of the first securing means and the second securing means to bring the first securing means and the second securing means toward and away from each other. Means are provided for effecting relative rotation of the first securing means and the second securing means.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1A is a top plan view in section of the apparatus in FIG. 1.

FIG. 1B is a detailed perspective view of a paddle.

FIG. 15A-15C are orthographic views of pipe segments with end curvatures.

DETAILED DESCRIPTION

Figure 1:
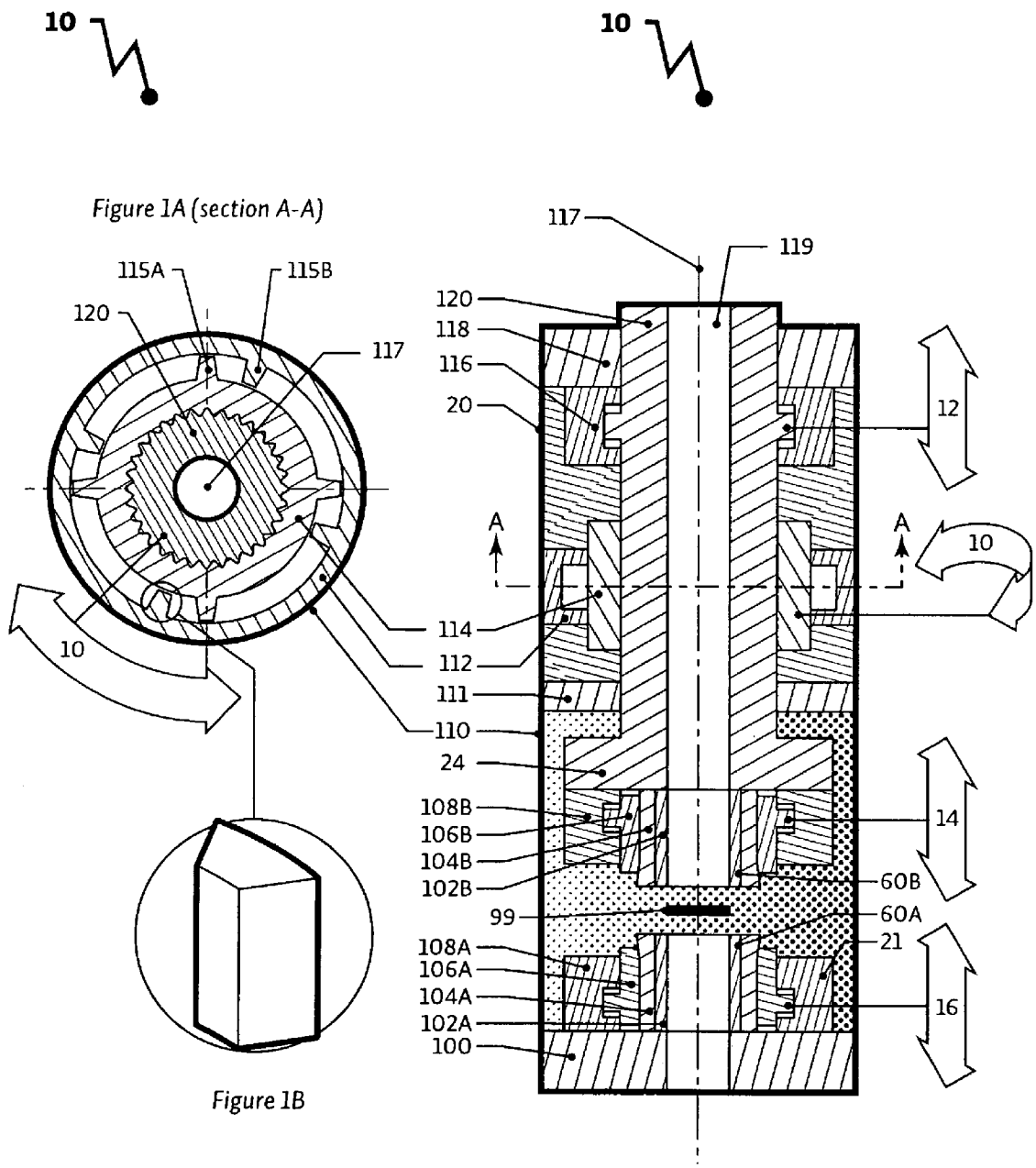
FIG. 1 is side elevation view in section of an apparatus for induction friction solid state welding.
Figure 2:
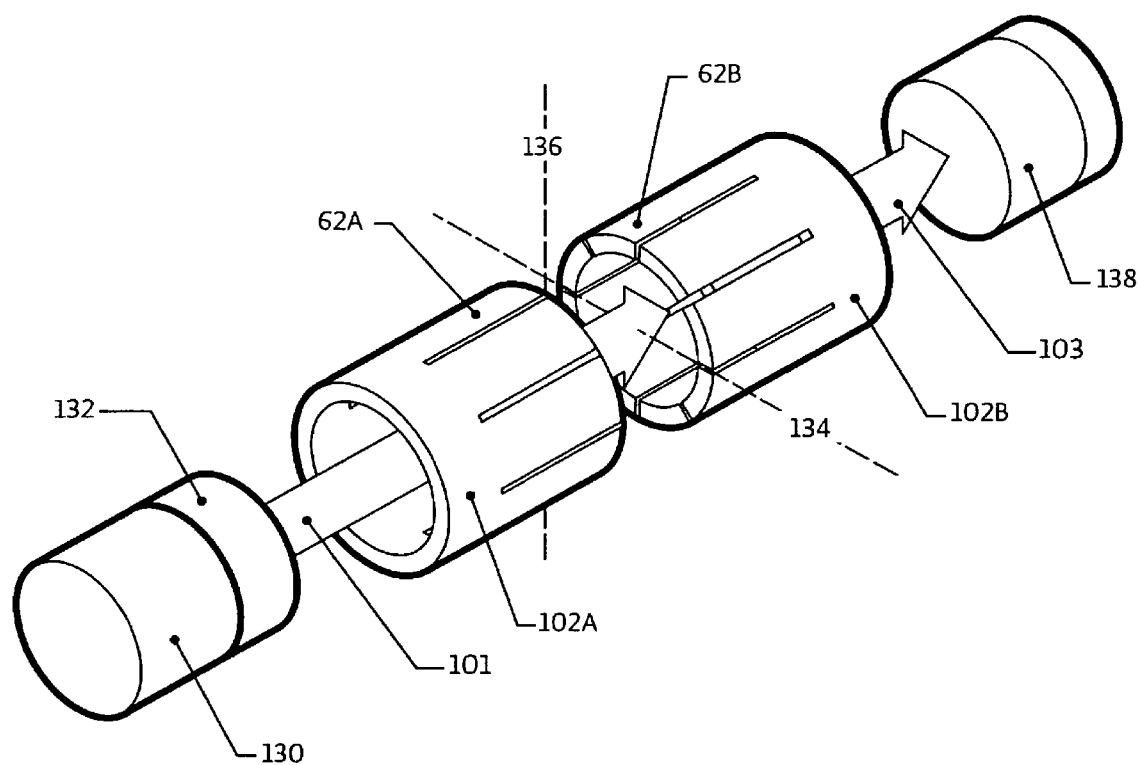
FIG. 2 is an exploded perspective view of work-pieces inserted into the inner chucks.

An apparatus for induction friction solid state welding generally identified by reference numeral 10, will now be described with reference to FIG. 1 through 15.

Structure and Relationship of Parts:

The machine is designed to perform the mechanics that induction/friction weld two parts together as described in U.S. Pat. No. 6,637,642 (Lingnau, Method of Solid State Welding and Welded Parts, 28 Oct. 2003). The machine control system (not shown) controls apparatus 10 to perform a series of sequential steps that are described below. The machine control system provides displacement-type movements rather than force-based movements through this assembly although the control system could alternatively be designed to provide force based motions or a combination of displacement control and force control. Apparatus 10 as depicted has been designed to be compact in order to give proportionally larger bearing areas with scale-reduced radial play.

Referring to FIG. 1, apparatus 10 has four main assemblies: (1) a body 20; (2) the static lower chucking assembly 21; (3) the motive assembly 24; and (4) the coil 99. The static lower chucking assembly 21 and the motive assembly 24 act as first and second securing means for temporarily securing tubular workpieces. While not shown, it will be understood that there is associated peripheral equipment associated with coil 99, such as a coil platform. The necessary support structures necessary to support apparatus 10 have also not been shown, as these will be known to those skilled in the art, and may vary depending on the conditions in which apparatus 10 is used. It will be understood that FIG. 1 is a conceptual drawing, and that when constructing apparatus 10, it may be necessary to use certain techniques known in the art, such as stacked rings to enclose pistons, etc. rather than the hollowed out body as depicted.

The body 20 has five main components: (a) the cylindrical welding chamber 110, which acts as the main load-bearing member; (b) the lower end cap 100 at a first end, which helps contain the welding atmosphere and also supports the lower chucking assembly; (c) the rotary drive static outer race 112, which acts as a stator, is shown in more detail in FIG. 1A, (d) the upper end cap 118 at a second end, which allows the passage of the upper end of the motive assembly 24, and (e) the atmosphere curtain 111, which contains the welding atmosphere. Body 20 has a work-piece receiving bore 119 that extends between the lower end cap 100 at the first end and the upper end cap 118 at the second end.

The first securing means in the form of lower chucking assembly 21 has four main components: (a) the lower chuck base 108A, which anchors the assembly to the welding chamber 110 and lower end cap 100; (b) the lower chuck slide 106A, which is acted upon by the hydraulic chambers to independently compress or release the outer chuck 104A through a linear slide in the direction of arrow 16; (c) the lower inner chuck 102A, which holds the work-pieces; and (d) the lower outer chuck 104A, which is acted upon by the slide 106A to grasp or release the inner chuck 102A. The lower chucking assembly 21 is rigidly attached to body 20.

The motive assembly 24 which includes the second securing means, has six main components: (a) the upper chuck base 108B, which is functionally similar to the lower chuck base 108A; (b) the upper chuck slide 106B, which is similar to the lower chuck slide 106A but is able to slide independently in the direction of arrow 14; (c) the upper outer chuck 104B, which is functionally similar to the lower outer chuck 104A; (d) the upper inner chuck 102B, which is functionally similar to the lower inner chuck 102A; (e) the spindle 120, which acts as the main load-bearing member and transmits both compression (and tension) and torque to the work-pieces; and (f) the torque transmission collar, referred to as the female spline collar 114, with paddles 115A (shown in FIG. 1A). The spindle has a hollow bore 119 that is sized to accommodate the maximum workpiece diameter and provided with screw-holes and shoulders to secure the motive assembly 24, while the static assembly 21 secured to the end cap 100. As shown in FIG. 1B, the paddles 115A are generally shapes as "curved trapezoids", and the stator 112 has matching paddles 115B. The female spline collar 114, which acts as a rotor, transmits the torque developed by the hydraulic rotary drive to spindle 120, and thus upper chucks 102B and 104B, while allowing the male spline on the spindle 120 to have smooth, accurate linear movement along the machine centre axis 117. By directing hydraulic fluid into the even numbered set of cavities between the rotor paddles 115A and the stator paddles 115B, rotational motion of the rotor 114 is produced in one direction. By switching the fluid flow into the odd numbered set of cavities, rotational motion in the other direction is achieved. The spindle 120 is a high precision hollow-bore cylindrical component that imparts independent linear and rotary motions to the upper chuck components 102B and 104B with good accuracy and repeatability, nearly zero backlash, and accommodates high speed rotational reversal motions. With the lower chucking assembly 21 being held stationary, the motive assembly 24 allows relative rotation of the lower chucks 102A and 104A, and the upper chucks 102B and 104B, as well as relative movement toward and away from each other.

Referring to FIG. 1A, the torque available is directly proportional to:
the number of motive paddles 115A in the rotary drive. Practically, there may be between 1 and 8 paddles spaced equidistantly around the perimeter of the rotor 114, with smaller sized machines having fewer paddles to permit larger range of rotational motion, and larger sized machines having more paddles to deliver greater torques. Apparatus 10 may be designed such that the number of paddles may be changed;
the distance of the paddles 115A from the center axis 117;
the area of the paddles 115A; and
the hydraulic pressure applied to the paddles 115A.

In addition, the angular range of motion is inversely proportional to the number of motive paddles 115A. For example, if the size of paddles 115A, their distance from the center axis 117 and the hydraulic pressure are sized such that two paddles 115A provide a torque of 40,000 ft-lb, then adding more paddles 115a will have the following results.

| No. of paddles | Possible torque | Possible angle |
| --- | --- | --- |
| 2 | 40000 ft-lb | 160° |
| 4 | 80000 ft-lb | 70° |
| 6 | 120000 ft-lb | 40° |

Referring to FIG. 1, the linear offset is accomplished through a fluid actuated expandable actuator, such as a hydraulic ram 116, that displaces the motive assembly in the direction of arrow 12 to bring the lower and upper chucks 102A, 102B, 104A and 104B toward and away from each other, while still allowing radial movement around the machine centre axis 117. These two movements result in a compound movement relative to the lower chuck assembly 21, which is static. Again, the rotary hydraulic drive 112 and 114 imposes rotary motion in represented by arrow 10 while the hydraulic ram 116 imposes an independent linear motion represented by arrow 12 along the machine centre axis 117. FIG. 1A is a cross-section of the assembly 10 showing the rotary hydraulic drive assembly including the spline collar 114, paddles 115A, the stator 112, and welding chamber of 112.

Referring to FIG. 1, the coil 99 and associated parts (not shown) may not be directly attached to the welding chamber. The coil acts as an induction heating means that is movable between an operative position within the work-piece receiving bore 119 and a stored position withdrawn from the work piece receiving bore 117. A discussion of platform mounting options is given below with reference to FIG. 7 through 9. They are exclusively concerned with the process of positioning the coil 99 at the optimal location and orientation in space to optimally balance the induction heat input into the two opposing weld surfaces of the work pieces.

Apparatus 10 has a through-bore 119 along centre axis 117 to allow the passage of long work-pieces or pipeline style welding operations. The internal surfaces of the inner chucks 104A and 104B are preferably shaped to match the external surfaces of the work-pieces and are provided with friction enhancing surface textures and hardening to discourage slippage and galling.

Figure 3:
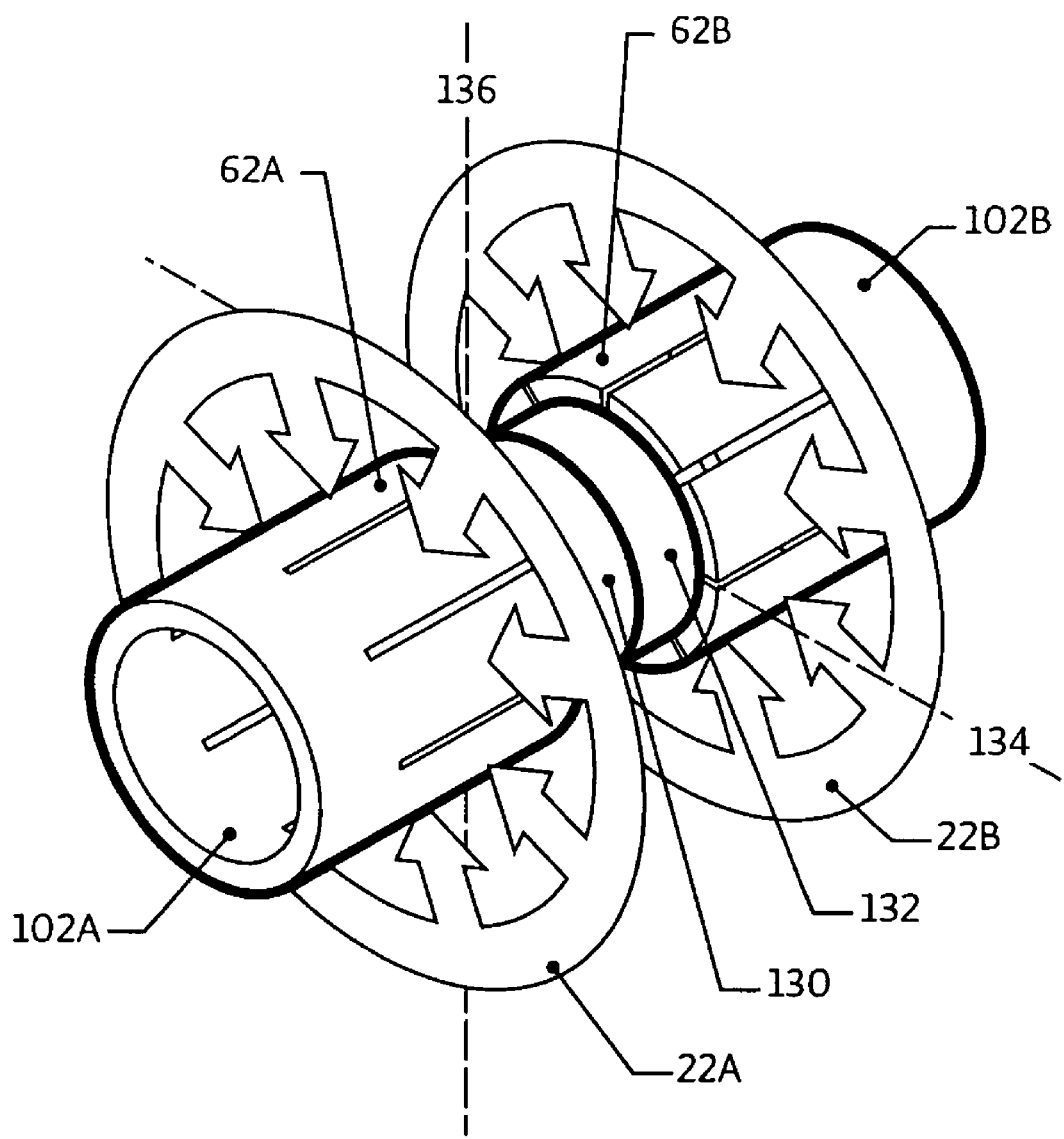
FIG. 3 is a perspective view of the inner chucks clamping the work-pieces.

The integrated hydraulic systems (not shown) of chuck assemblies 21 and 24 displace the tapered chuck slide in the direction of arrows 16 and 14 over reverse-tapered fingers 60A and 60B machined into the outer chucks 104A and 104B. Referring to FIG. 3, this in turn flexes the close fitting fingers 62A and 62B of the inner chucks 102A and 102B to rigidly grasp the work-pieces 130 and 132.

The function of the various elements at each step in the welding operation will now be given, with reference to the steps shown in FIG. 14.

Figure 14:
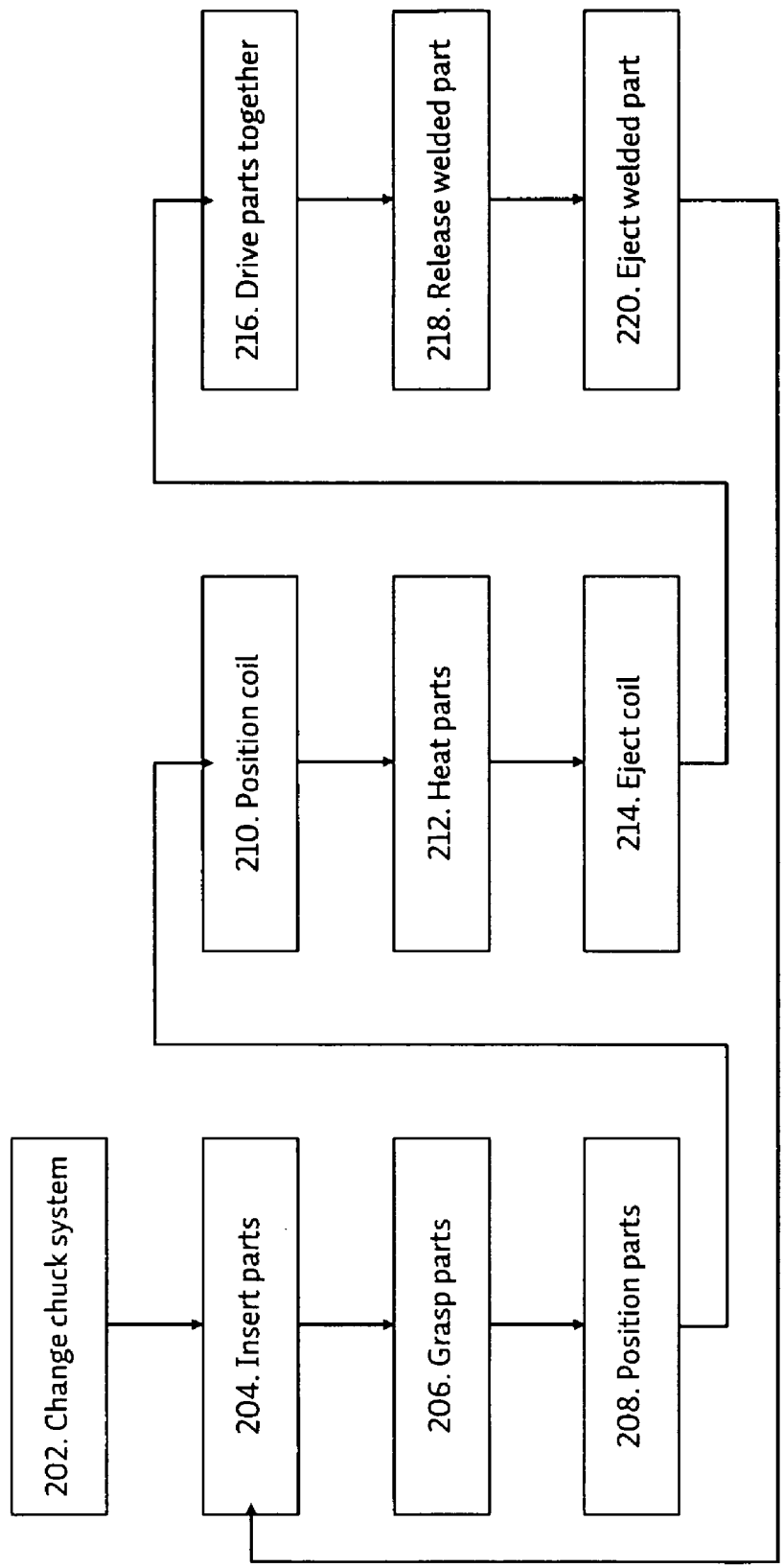
FIG. 14 is a flow chart of the machine control steps.

At step 202 in FIG. 14, the chuck system is changed if necessary to accommodate the work pieces to be welded. At step 204, and referring to FIG. 2, the inner chucks 102A and 102B are in their cold-contact position with the position reference lines 134 and 136 at 90° to each other and with respect to the machine centre axis 117 (shown in FIG. 1). The work-pieces 130 and 132 are inserted as represented by arrow 101 as a stacked assembly, and in so, doing push, as represented by arrow 103, the previously-welded assembly 138 out into the bore 119 of spindle 120 shown in FIG. 1. This direction of parts flow can be reversed to minimize heat transfer from the welded parts to the spindle 120.

At step 206 in FIG. 14, and referring to FIGS. 1 and 3, the outer chucks 104A and 104B (shown in FIG. 1) independently compress the inner chucks 102A and 102B to grasp the work-pieces 130 and 132, as represented by arrows 22A and 22B while in the cold-contact position. These clamping forces are held until work-pieces 130 and 132 are welded and are ready to be ejected, as will be discussed with reference to FIG. 13. Note that the clamping forces imparted by the outer chucks 104A and 104B are independent, and not necessarily identical.

Figure 4:
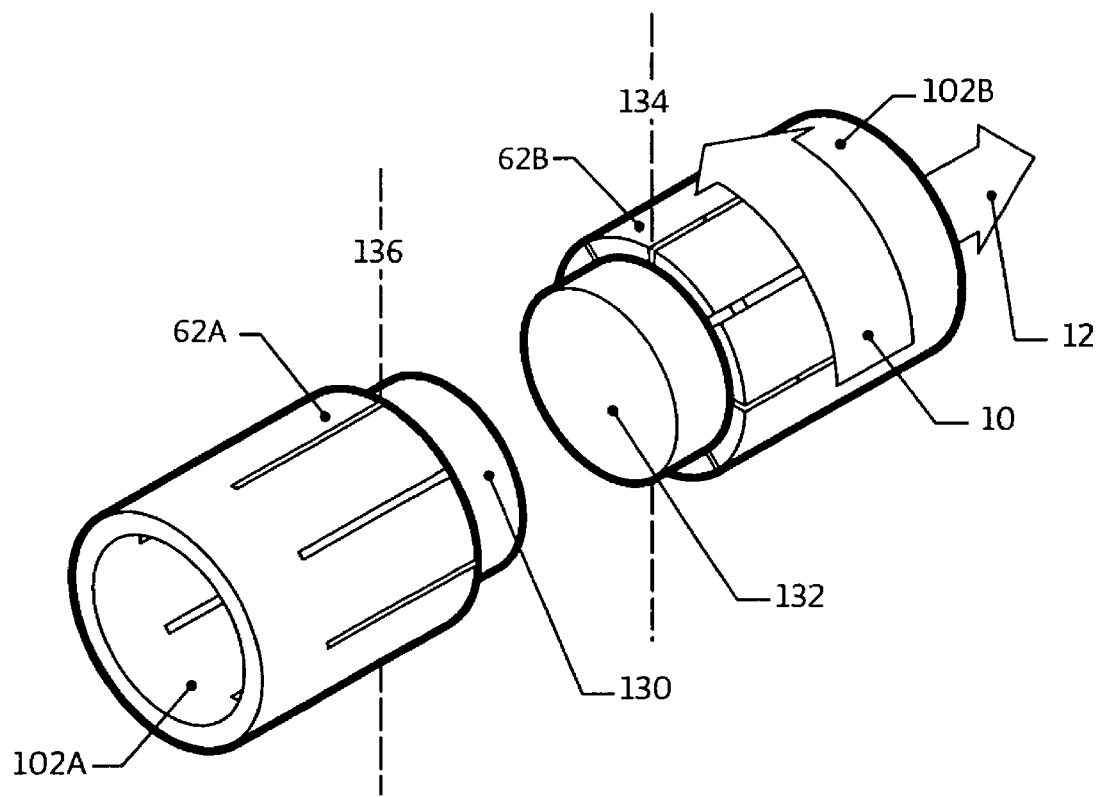
FIG. 4 is a perspective view of the upper inner chuck being displaced.

At step 208 in FIG. 14, and referring to FIGS. 1 and 4, the motive assembly 24 displaces the inner chucks 102A and 102B holding work-pieces 130 and 132 to the heating position as shown. The heating position consists of a linear displacement along, and an angular displacement around, the machine centre axis (shown here as having the position reference lines 134 and 136 at 0° to each other with respect to the machine centre axis).

Figure 5:
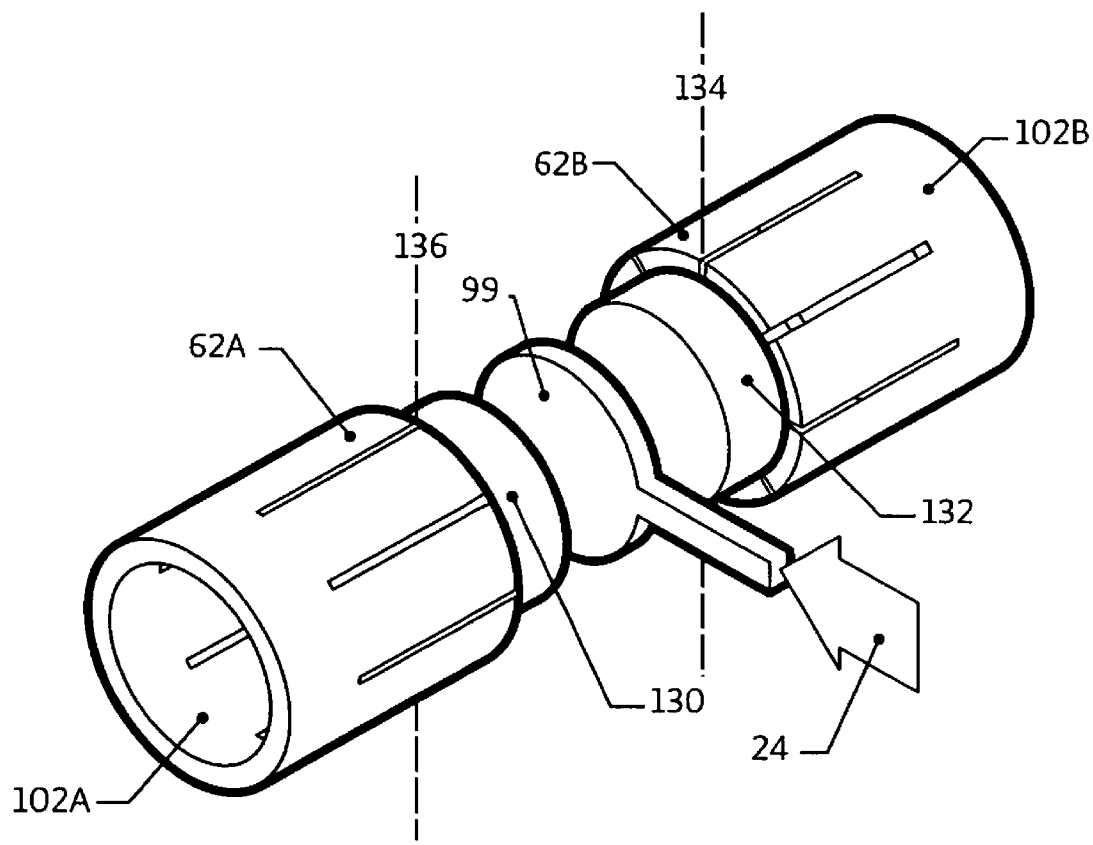
FIG. 5 is a perspective view of the coil positioned between the workpieces.

At step 210 in FIG. 14, and referring to FIG. 5, the coil 99 is inserted into the work volume by the coil actuator, which could be of either the linear motion type or rotary motion type. The movement discussed below relates to a linear motion type. During heating, the work-pieces 130 and 132 and the inner chucks 102a and 102b are held stationary, and the coil 99 is positioned between the work-pieces 130 and 132. The position of the coil 99 is defined by six variables: the x, y, and z offset from a zero point, and the roll, pitch, and yaw from the respective orthogonal centerlines. The coil positioning assembly 125 shown in FIG. 7 controls the coil position (see below).

Figure 6A:
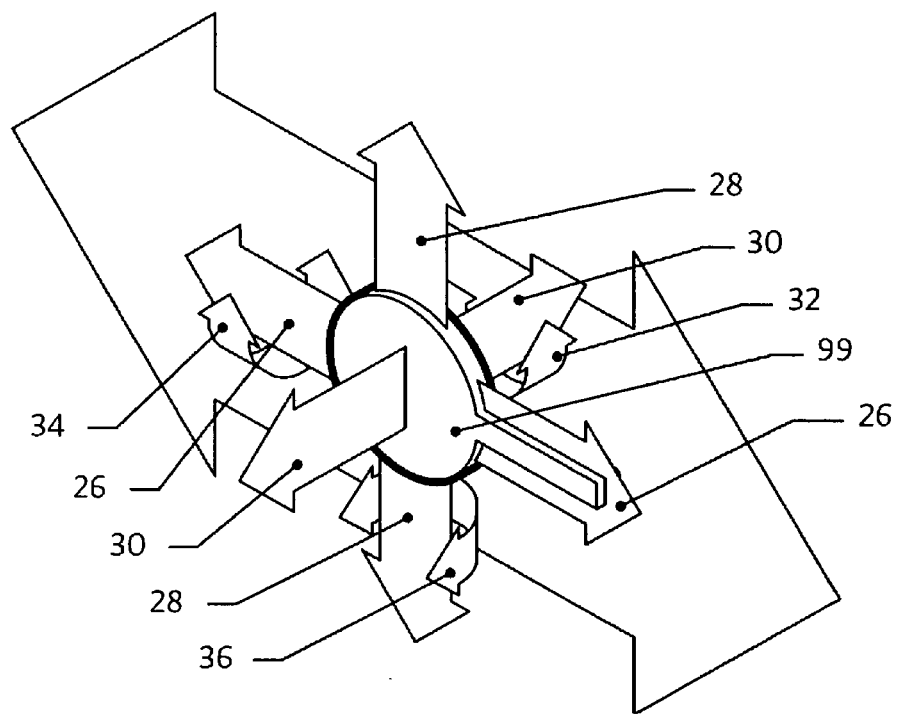
FIGS. 6A and 6B are perspective views of the coil and its movements.
Figure 6B:
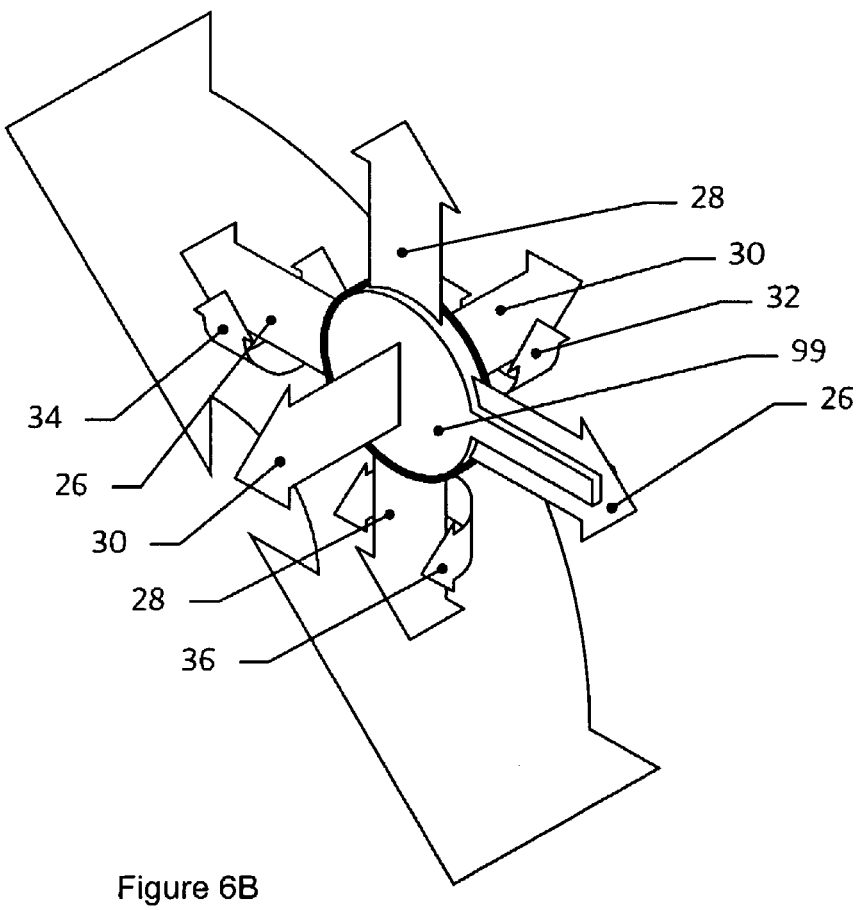

Referring to FIG. 6A, the coil 99 is positioned through six independent measures based in the Cartesian coordinate system, centered on a predefined zero-point: (a) the x offset 26; (b) the y offset 28; (c) the z offset 30, which is along the machine centre axis; (d) the roll 32; (e) the pitch 34; and (f) the yaw 36. The coil 99 is positioned independently of the actuator—in this case, linearly. The preferred scale and configuration of the coil positioning assembly is entirely dependant on the design of the actuator. Referring to FIG. 6B, the coil 99 may also be positioned independently of the actuator in a rotary sense. Again, the preferred scale and configuration of the coil positioning assembly 125 shown in FIG. 7 is entirely dependent on the design of the actuator.

Figure 7A:
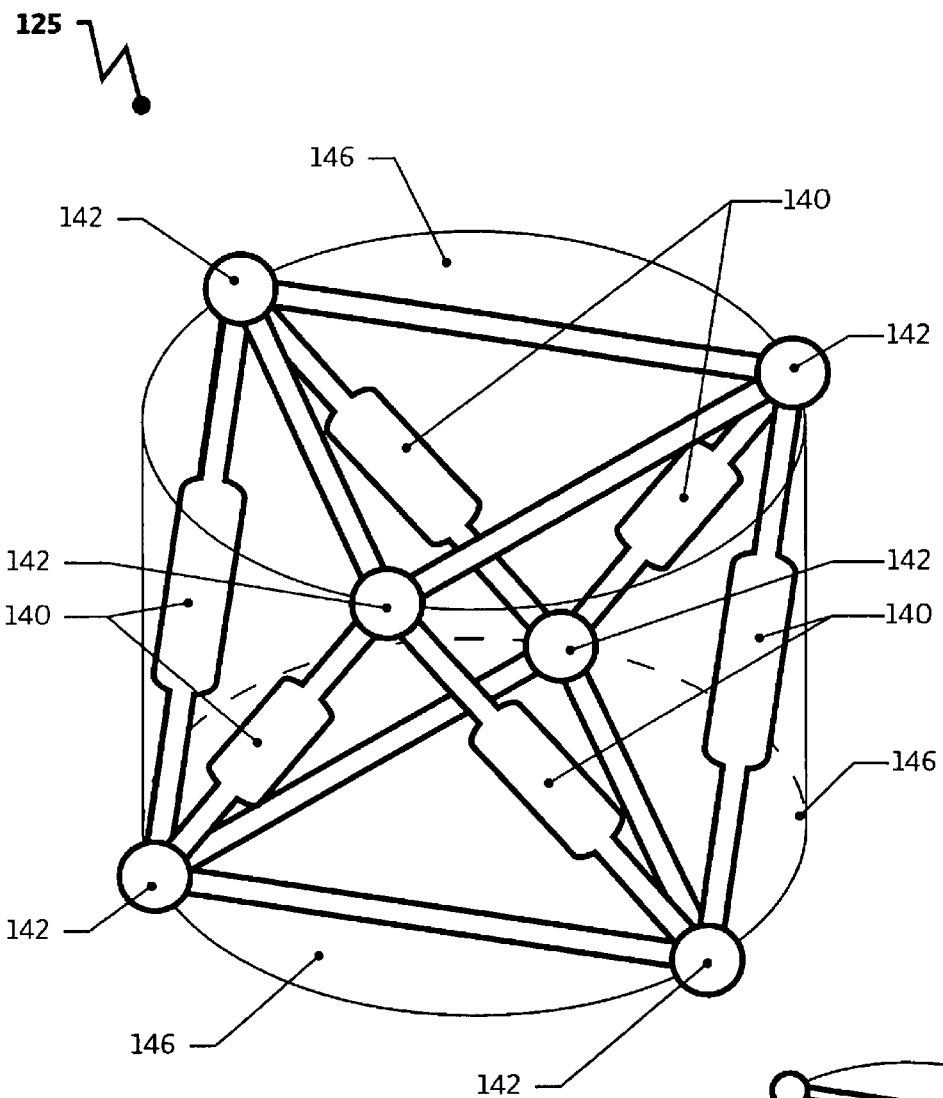
FIG. 7 is a perspective view of a Stewart platform acting as a coil positioning assembly.
Figure 7B:
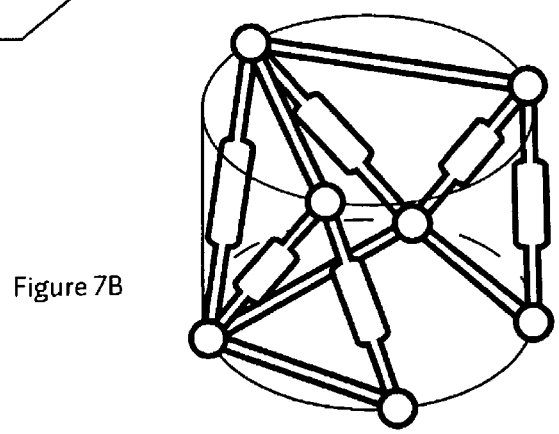

Referring to FIG. 7, an example of a suitable coil positioning assembly 125 is shown. The coil positioning assembly 125 is essentially a Stewart platform specific to the smaller ranges of motion that are required by the coil movement envelope. The Stewart platform is in the form of an expandable polyhedron that is used to move the coil between the operative position to act as an induction heater, and the stored position, to allow the workpieces to be welded once heated appropriately. Thus, this specific Stewart platform 125 has four defining characteristics:

Each actuator-pair made up of actuators 140 (commonly referred to as "struts") converge at a common joint 142 (commonly referred to as a "node"). This leads to a more simple, stronger structure with fully independent actuators 140, and only six joints 142.

At the neutral position, where the actuators are midway between maximum and minimum extension, the six actuator-pairs 140 with the virtual connectors formed within the end plates 146 form six equilateral triangles. There are two more identical equilateral triangles formed by the three mounting points on the base-plates (i.e., the virtual connectors)—producing a minimized stress octahedron made up of equilateral triangles.

The structure is unidirectional—i.e., the top and bottom mounting plates are interchangeable.

The actuators are human-adjusted. The human operator interacts as guided by a computerized closed position feedback loop. This is possible because the system is not over-constrained as are many commercial Stewart platforms due to their use of more than six pivot joints. In such over-constrained systems, changing the length of one leg necessarily requires the simultaneous compensation of the length in several other legs to prevent warping of the platforms. The economies provided by manual adjustment on the occasional basis typically required does not preclude future use of computer-controlled actuators in this specific application.

Besides the closed, regular (symmetric) type of octahedron described above which is established in the prior art, it is possible to use a modification of the Stewart platform where the octahedron is divaricated, that is "cut open" perpendicular to the end plates by splitting one of the nodes. It is not obvious that it is possible to divaricate a Stewart platform without compromising its functionality but the present invention has been reduced to practice by the authors, proving that the concept works. This modification brings several advantages to the present application which will be detailed below.

Figure 8A:
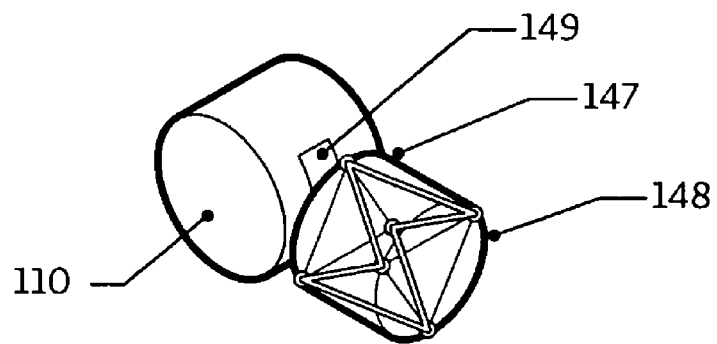
FIG. 8A is a perspective view of the Stewart platform mounted to the welding chamber of the apparatus in FIG. 1.

Referring now to FIG. 8A through 8D, the Stewart platform 125 can be mounted in various orientations as required by the design of the coil actuator. FIG. 8A through 8D show four variations:

In FIG. 8A, the platform stationary end 147 is mounted onto the welding chamber 110 by adaptor-plate at the coil access port 149. The platform mobile end 148 holds the coil actuator. This configuration is best suited to a linear coil actuator—note that the linear coil actuator passes through the platform itself as it accesses the coil access port 149. Therefore, the reaction force dynamic loads from the rapid motion of the coil are equally distributed through all of the platform joints and actuators.

Figure 8B:
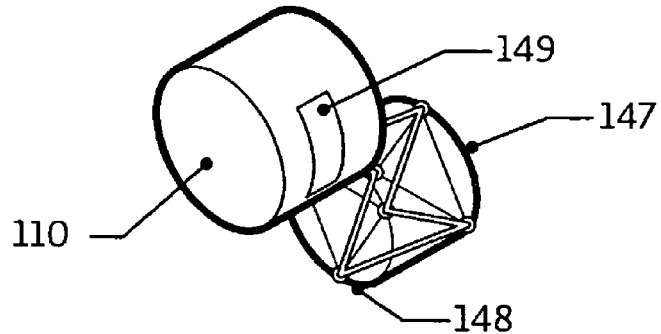
FIG. 8B-8D are perspective views of alternate mounting options for the Stewart platform.

In FIG. 8B, the platform stationary end 147 is mounted onto the welding chamber 110 by adaptor-plate under the machine, but away from the coil access port 149. The platform mobile end 148, which is closer to the coil access port 149, holds the coil actuator. Alternately, mount the platform stationary end to the floor by adaptor-plate. This configuration is best suited to a side-mounted rotary coil actuator.

Figure 8C:
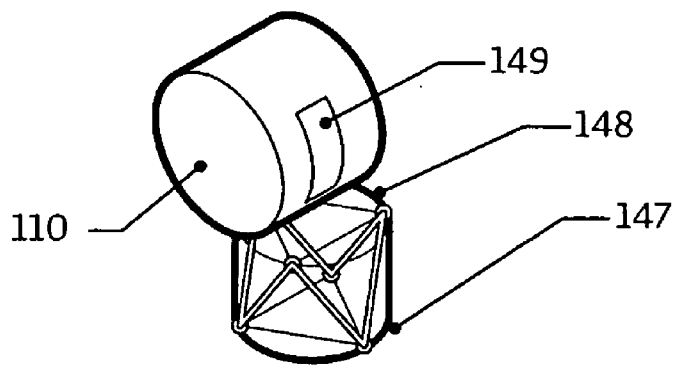

In FIG. 8C, the platform stationary end 147 is mounted to the floor by adaptor-plate underneath the coil access port 149. The platform mobile end 148 holds the coil actuator. This configuration is best suited to either a top-mounted rotary coil actuator or a large top-mounted linear actuator.

Figure 8D:
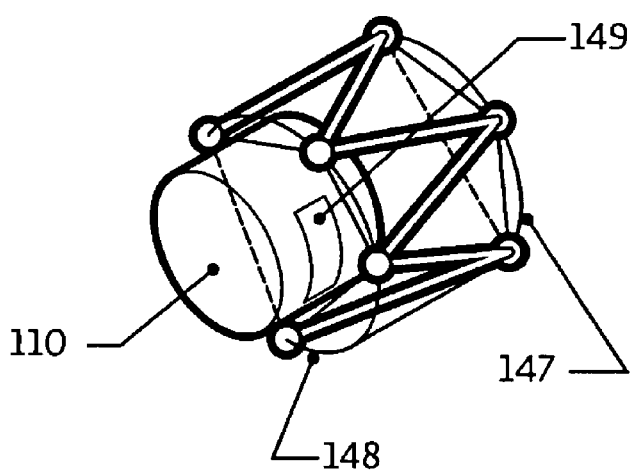

In FIG. 8D, the divaricated Stewart platform partly encircles the welding chamber with the stationary platform end mounted to the endplate of the welding chamber and the length of the struts being sized such that the platform mobile end is approximately coplanar with the anterior end of the stationary chuck so that when the coil actuator is mounted on the mobile endplate, the coil when extended is approximately centered between the two chucks.

Figure 9:
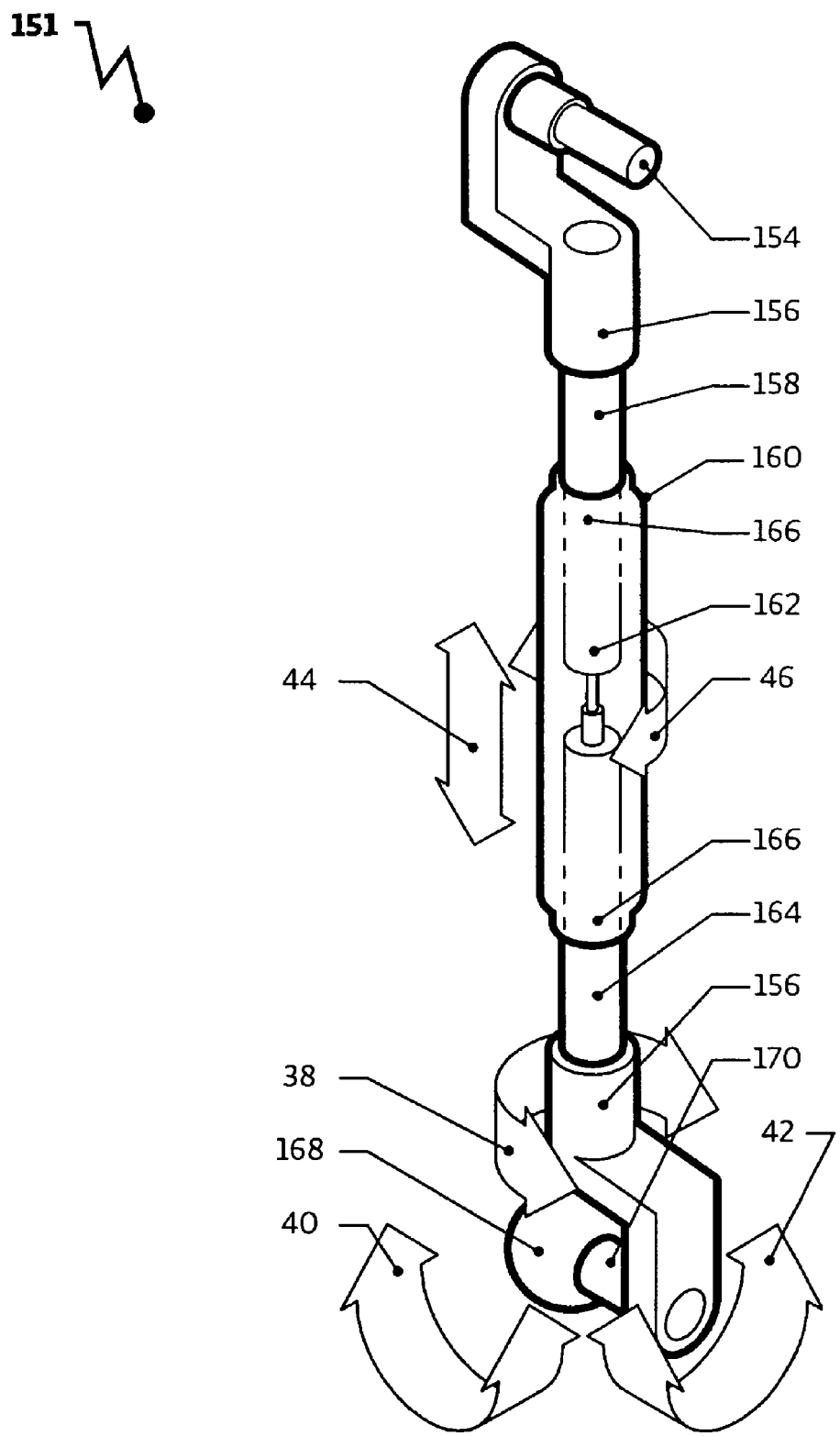
FIG. 9 is a perspective view of a manual actuator for the Stewart platform.

It will be understood that actuators 140 may be manually actuated, or servoactuated. Referring now to FIG. 9, an example of a manually actuated actuator 140 of the Stewart platform 125 is shown, which is made up of eight components, each of which have a total of seven degrees of freedom (DOF). Each components and their role is as follows:

The ball 168 provides three of the six required DOF: a roll 38, pitch 40, and yaw 42 with respect to the local zero point, which is the centre of the joint. The ball 168 is held by a rod-end (not shown) that is subsequently rigidly attached to the nearest platform end plate (not shown). Note that the opposite (upper) ball is not shown to increase legibility, but does provide an additional three DOF.

The male stub shaft 154 is tethered to, and rides within, the subsequent manual actuator/female stub shaft. These allow a relative twist between actuator pairings through the ball.

The doglegs 156 hold the stub shafts 154 and 170 and the threaded rods 158 and 164. This component also provides the necessary clearances around the ball joint 168 to allow the required platform ranges of movement.

The left-hand threaded shaft 158 is rigidly inserted into the dogleg such that there can be no relative motion. The turnbuckle 160 is threaded over the opposite end of the shaft 158.

The turnbuckle 160, including the position locking mechanisms 166 (not shown in detail) provides the linear displacement DOF and a subsequent precise mechanical lock-down of the actuator 140. The human operator, within the feedback loop of the sensor (below) twists the turnbuckle 160 in the direction of arrow 46, which results in a linear displacement in the direction of arrow 44. As each of the full set of six actuators 140 is sequentially adjusted, it is locked in length by the position locking mechanisms 166. Note that all six manual actuators interact as a unit as required by the geometries of the entire Stewart platform 125.

The position sensor 162 provides a feedback signal to an electronic system (not shown) containing a readout corresponding to the actual length (joint-to-joint) of the manual actuator 140.

The right-hand threaded shaft 164 is functionally similar to the left-hand threaded shaft 158 above.

The female stub shaft 170 tethers, and rides about, the male stub shaft 154, while being mounted firmly into the ball 168. This shaft/ball interface does not allow for any relative movement.

Figure 10:
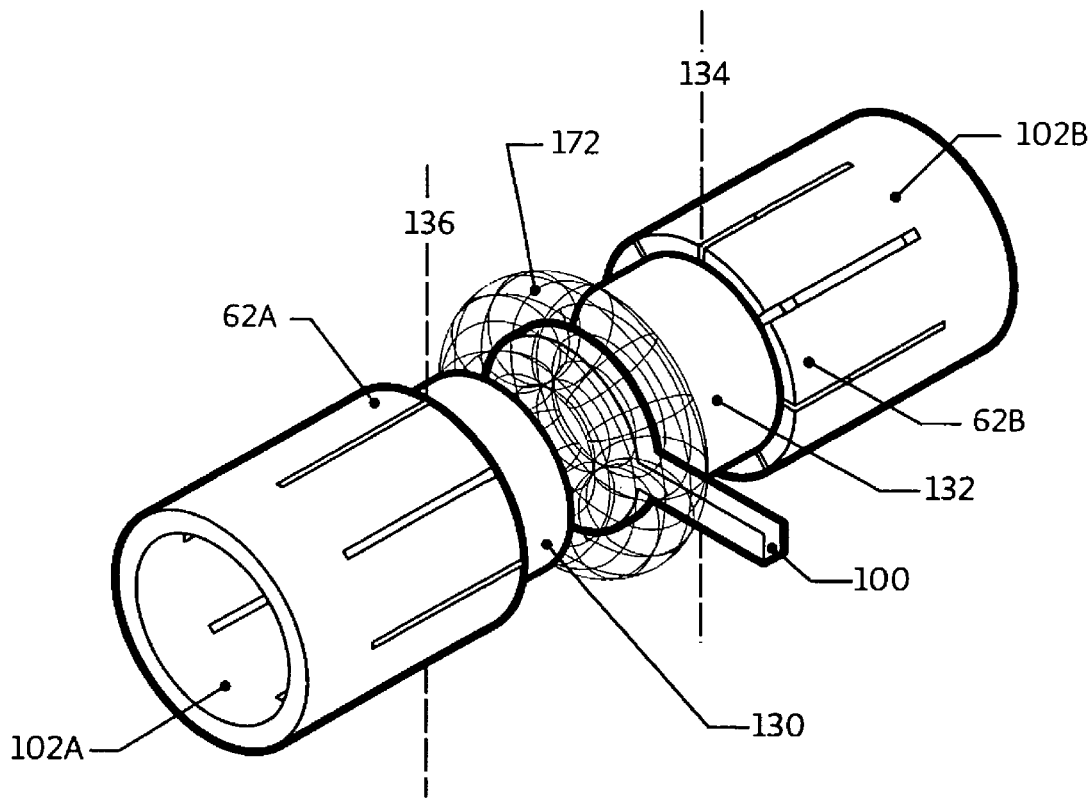
FIG. 10 is a perspective view of work-pieces being heated by the coil.

Referring now to step 212 in FIG. 14 and FIG. 10, the inner chucks 102A, 102B, the work-pieces 130, 132, and the coil 99 are in the heating position after being positioned using the components described above. The induction system is turned on, which results in three mutually induced effects: (a) a circular current within the coil, (b) a toroidal magnetic field 172, and (c) an opposing circular induced current within the two work-pieces 130, 132. The current heats the work-pieces based on various factors included with the position of the coil with respect to the work-pieces 130, 132. U.S. Pat. No. 6,637,642 (Lingnau, Method of Solid State Welding and Welded Parts, 28 Oct. 2003) discusses this process in more detail.

Figure 11:
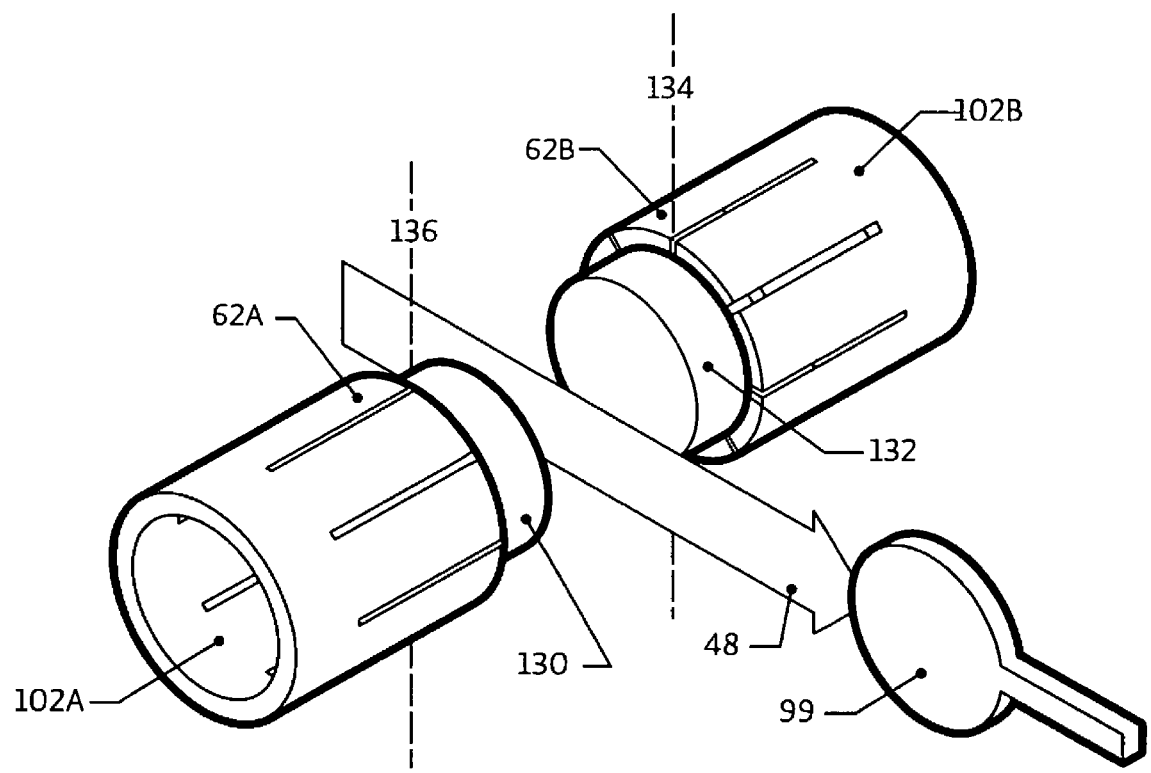
FIG. 11 is a perspective view of the work-pieces after removal of the coil.

Referring now to step 214 in FIG. 14 and FIG. 11, the coil actuator (not shown) ejects the coil 99 in the direction of arrow 48 after the work-pieces 130, 132 have been heated for a prescribed length of time at the required power level. The inner chucks 102A, 102B and the grasped work-pieces 130, 132 generally remain stationary in the heating position, although for certain applications there can be advantage to rotating the upper chuck 102B during heating. While arrow 48 shows a linear path (implying a linear coil actuator), a rotary path (implying a rotary coil actuator) is not precluded.

Figure 12:
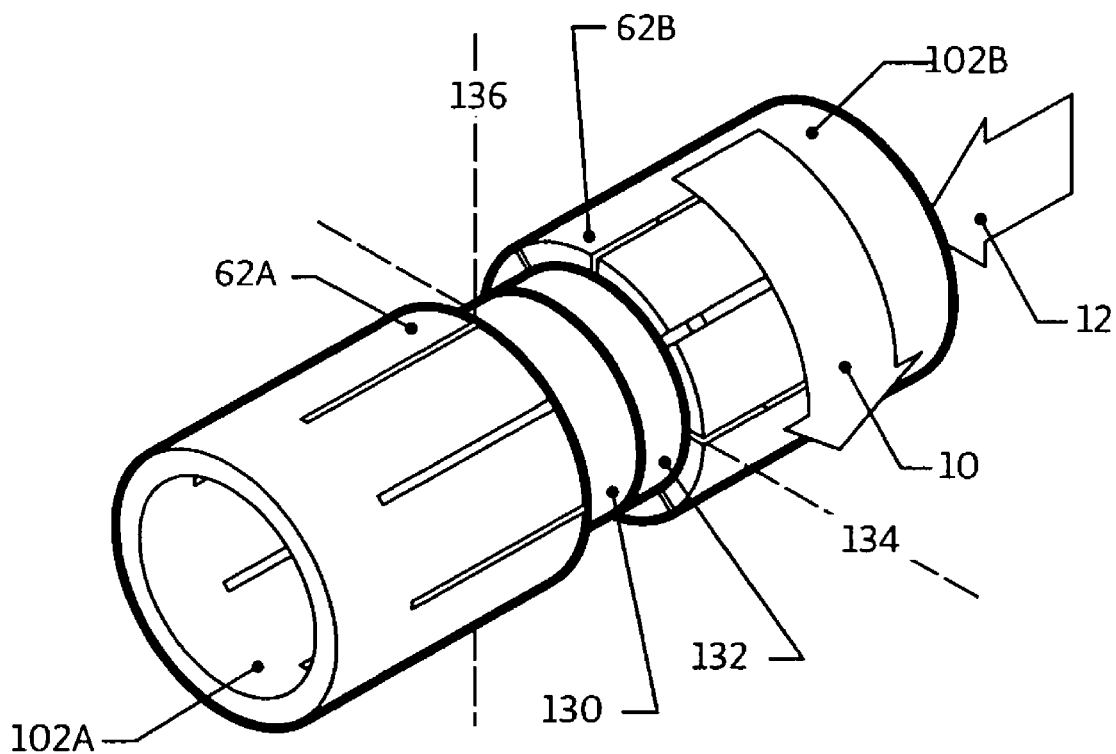
FIG. 12 is a perspective view of the work-pieces being brought together.

Referring now to step 216 in FIG. 14 and FIGS. 1 and 12, the motive assembly 24 displaces the upper inner chuck 102B through two simultaneous, but independent welding movements: a linear displacement in the direction of arrow 12 along the machine centre axis, and a rotary displacement in the direction of arrow 10 about the machine centre axis. The new orientation of the components is the weld-stop position. Note that this position generally entails the inner chucks being closer together than in the cold-contact position. However, the thermal expansion of the heated parts may in some cases provide enough interference to effect good welds at the cold-contact position. As taught in U.S. Pat. No. 6,637,642 (Lingnau, Method of Solid State Welding and Welded Parts, 28 Oct. 2003) a forging phase involving simultaneous compression and lateral shear immediately follows the heating phase, as soon as the coil 99 is ejected from the heating position. In some applications it is advantageous to use the hydraulic ram 116 shown in FIG. 1 to pull back on the weld before it has cooled in order to reduce the bulging which would otherwise occur at the weld plane. In other cases, it is advantageous to pull back on the weld after it is partially or fully cooled in order to test the integrity of the weld.

Figure 13:
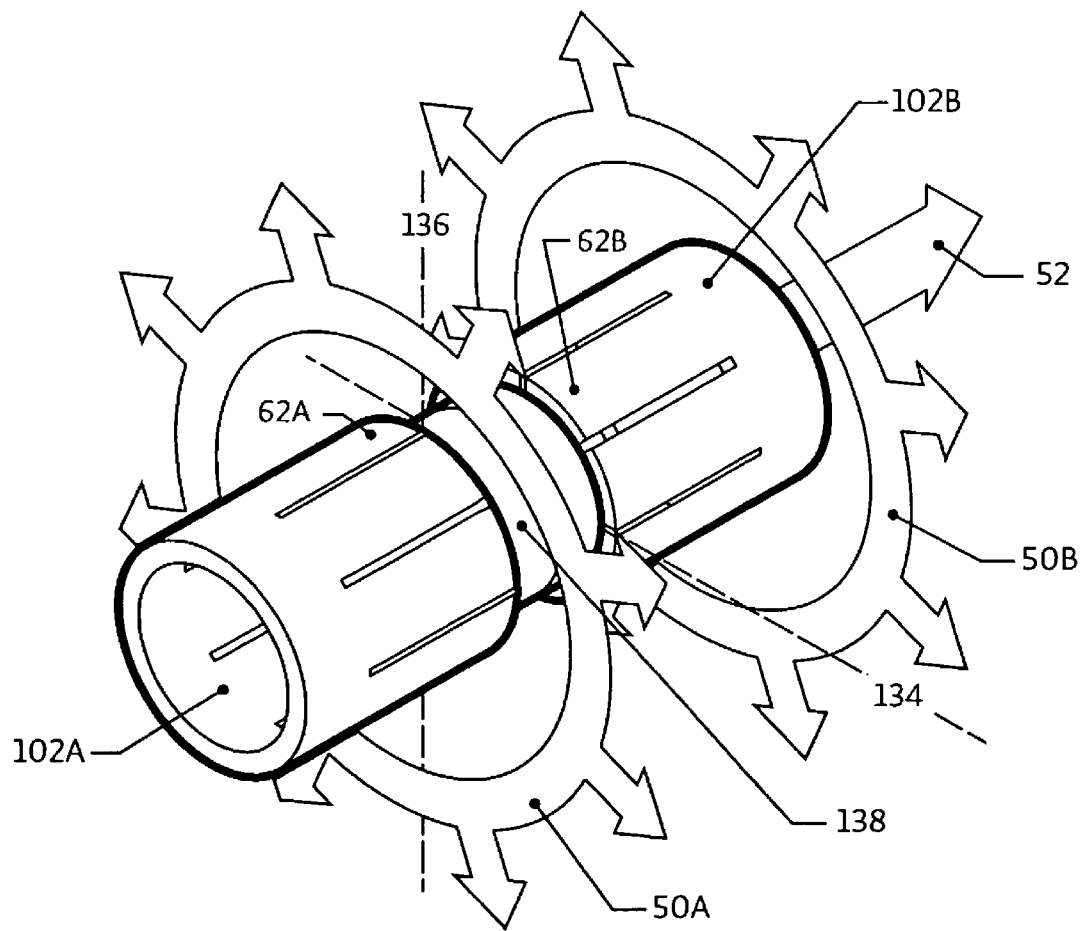
FIG. 13 is a perspective view of the welded-work-pieces being released.

Referring now to step 218 in FIG. 14 and FIGS. 1 and 13, after completing the welding cycle, the outer chucks 106A and 106B release the independent pressures represented by arrows 50A, 50B on the inner chucks 102A and 102B, which in turn releases the welded work-piece 138. The welded work-piece may then be ejected in step 220, which may be accomplished in combination with inserting new work-pieces 130 and 132 by returning to step 204.

Advantages:

The machine performs two simultaneous movements: a push and twist. This design allows simultaneous axial motion and rotational motion at high torque levels and high axial loadings with the minimum possible amount of backlash in both axes. The mating splines are closely sized to further minimize the rotational backlash. Any other machine design will have more moving parts and therefore more backlash and typically less available torque.

The machine has a compact design, such that there is proportionally larger bearing areas with scale-reduced radial play. The compact design allows double end operation with a second set of chucks and welding chamber on the opposite end for doubled productivity from a single machine. Since the hydraulic actuator is compact, rigid and balanced in design, it is practical to mount a welding chamber on each end to permit near doubling of productivity for high volume production applications, provided the workpiece does not need to be fed through the spindle.

The apparatus 10 is also provided with a high tolerance bearing spline that minimizes backlash, and allows high speed reciprocating motion with good accuracy and repeatability. The apparatus 10 is also adaptable to various situations and materials: e.g. for a base case using two grasping paddles to generate 40000 ft-lb torque and 160° movement, then four grasping paddles generate 80000 ft-lb torque and 70° movement, and six grasping paddles generate 120000 ft-lb torque and 40° movement. Velocities and accelerations always remain independently controllable. The bore can accommodate work-pieces with diameters between 1 and 12 inch but larger sizes are possible as motivated by economics of the intended application. With the feed-through design, the apparatus 10 can be used to weld segments into a continuous piece of desired length. The large bore through the spindle permits a feed-through flow of workpieces, or even the welding of segments into continuous lengths.

The divaricated octahedron permits the centre of motion to be located at the geometric centre of the welding chamber, yet does not require full encirclement of the welding chamber. This in turn permits the use of shorter, stiffer linkages for a given size of welding chamber. Having the centre of motion for the Stewart platform co-located at the centre of the welding chamber has the advantage that the ranges of motion for the first 6 DOF are more equally balanced than would be the case for the arrangements of FIG. 8A, 8B, 8C.

In applications involving the welding of pipe segments 222 which may have end curvature as shown in FIG. 15A, the curves may be oriented such that the angles may be cancelled out as shown in FIG. 15C, rather than increasing the angle in the entire assembly as shown in FIG. 15B.

A significant issue in casing drilling has been the problem of alignment of screwed connections. The apparatus, as described above, provides a means for aligning curved pipes to prevent curvature build up.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An apparatus for induction friction solid state welding, comprising:
   a body having a first end, a second end and a work piece receiving bore that extends between the first end and the second end;
   first securing means for temporarily securing a first tubular workpiece in the work piece receiving bore;
   second securing means for temporarily securing a second tubular workpiece in the work piece receiving bore;
   induction heating means;
   an actuator to move the induction heating means between an operative position within the work piece receiving bore and a stored position withdrawn from the work piece receiving bore;
   an expandable polyhedron frame that moves the induction heating means between the operative position and the stored position;
   means for effecting relative movement of the first securing means and the second securing means to bring the first securing means and the second securing means toward and away from each other; and
   means for effecting relative rotation of the first securing means and the second securing means.

2. The apparatus of claim 1, wherein one of the first securing means and the second securing means is a stationary chuck and another of the first securing means and the second securing means is a moving chuck.

3. The apparatus of claim 2, wherein a fluid actuated actuator acting upon the moving chuck is used as the means to bring the first securing means and the second securing means toward and away from each other.

4. The apparatus of claim 2, wherein the moving chuck has an external spline and is encircled by a torque transmission collar, the torque transmission collar having internal spline which engage the external spline of the moving chuck, whereby the torque transmission collar serves as means for effecting relative rotation of the first securing means and the second securing means.

5. The apparatus of claim 1, wherein the expandable polyhedron is an expandable octahedron.

6. The apparatus of claim 1, wherein the expandable polyhedron is divaricated.

7. An apparatus for induction friction solid state welding, comprising:
   a body having a first end, a second end and a work piece receiving bore that extends between the first end and the second end;
   a stationary chuck for temporarily securing a first tubular workpiece in the work piece receiving bore;
   a moving chuck for temporarily securing a second tubular workpiece in the work piece receiving bore, the moving chuck having external spline;
   an induction heating coil movable by an expandable polyhedron frame between an operative position within the work piece receiving bore and a stored position withdrawn from the work piece receiving bore;
   a torque transmission collar encircling the moving chuck, the torque transmission collar having internal spline that interact with the external spline on the moving chuck;
   a fluid actuated expandable actuator applying an axial force to the moving chuck to move the moving chuck toward and away the stationary chuck; and
   a rotary drive applying a rotary force to the torque transmission collar and thereby effecting rotation of the moving chuck relative to the stationary chuck.

8. The apparatus of claim 7, wherein the rotary drive comprises:
   external rotor paddles on the torque transmission collar; and
   internal stator paddles on the body, and a relationship between the rotor paddles and the stator paddles defining fluid cavities between the torque transmission collar and the body, such that rotation of the torque transmission collar is effected by pumping a working fluid into selected fluid cavities.

9. The apparatus of claim 7, wherein the expandable polyhedron is an expandable octahedron.

10. The apparatus of claim 7, wherein the expandable polyhedron is divaricated.

* * * * *